United States Patent [19]

Zieve et al.

[11] Patent Number: 5,201,205
[45] Date of Patent: Apr. 13, 1993

[54] TWO AXIS TRACER FOR FASTENER OPERATIONS

[75] Inventors: Peter B. Zieve; Peter R. Vogeli; John L. Hartmann, all of Seattle, Wash.

[73] Assignee: Electroimpact, Inc., Seattle, Wash.

[21] Appl. No.: 761,227

[22] Filed: Sep. 16, 1991

[51] Int. Cl.⁵ .................................... B21L 15/28
[52] U.S. Cl. ............................. 72/31; 72/10; 72/453.19; 29/243.53
[58] Field of Search .............. 29/243.53, 243.54; 72/10, 12, 17, 31, 453.19, 461

[56] References Cited

U.S. PATENT DOCUMENTS

| | | | |
|---|---|---|---|
| 4,488,237 | 12/1984 | Aronson et al. | 72/461 |
| 4,713,592 | 12/1987 | Memmel | 72/12 |
| 4,827,757 | 3/1989 | Sartorio | 72/420 |
| 4,864,702 | 9/1989 | Speller, Sr. et al. | 29/243.53 |
| 4,878,368 | 11/1989 | Toutant et al. | 72/12 |

FOREIGN PATENT DOCUMENTS

| | | | |
|---|---|---|---|
| 2626339 | 12/1976 | Fed. Rep. of Germany | 72/461 |
| 0014161 | 1/1980 | Japan | 72/31 |
| 0148631 | 8/1985 | Japan | 72/10 |

Primary Examiner—David Jones
Attorney, Agent, or Firm—Clark A. Puntigam

[57] ABSTRACT

A two axis tracer (10) includes a back plate (34) and a front plate assembly (49) which includes a single sensing member (24) at the top end of which is a mushroom-shaped cap portion (28). Mounted on back plate (34) is a slider assembly (38) which moves in one direction between the front and rear edges of the back plate (34). The front plate assembly (49) is mounted to the slider assembly (38). A first air cylinder (60) operating a lever arm (52) provides movement of the sensing member (24) in the other direction, which is perpendicular to the one direction. A second air cylinder (68) includes an extendable rod, the end of which is secured to the back plate (34), providing movement of the front plate assembly (49) by action of the slider assembly (38). The top and peripheral edge of the cap portion (28) contact surfaces of the part to be worked in the two directions.

20 Claims, 4 Drawing Sheets

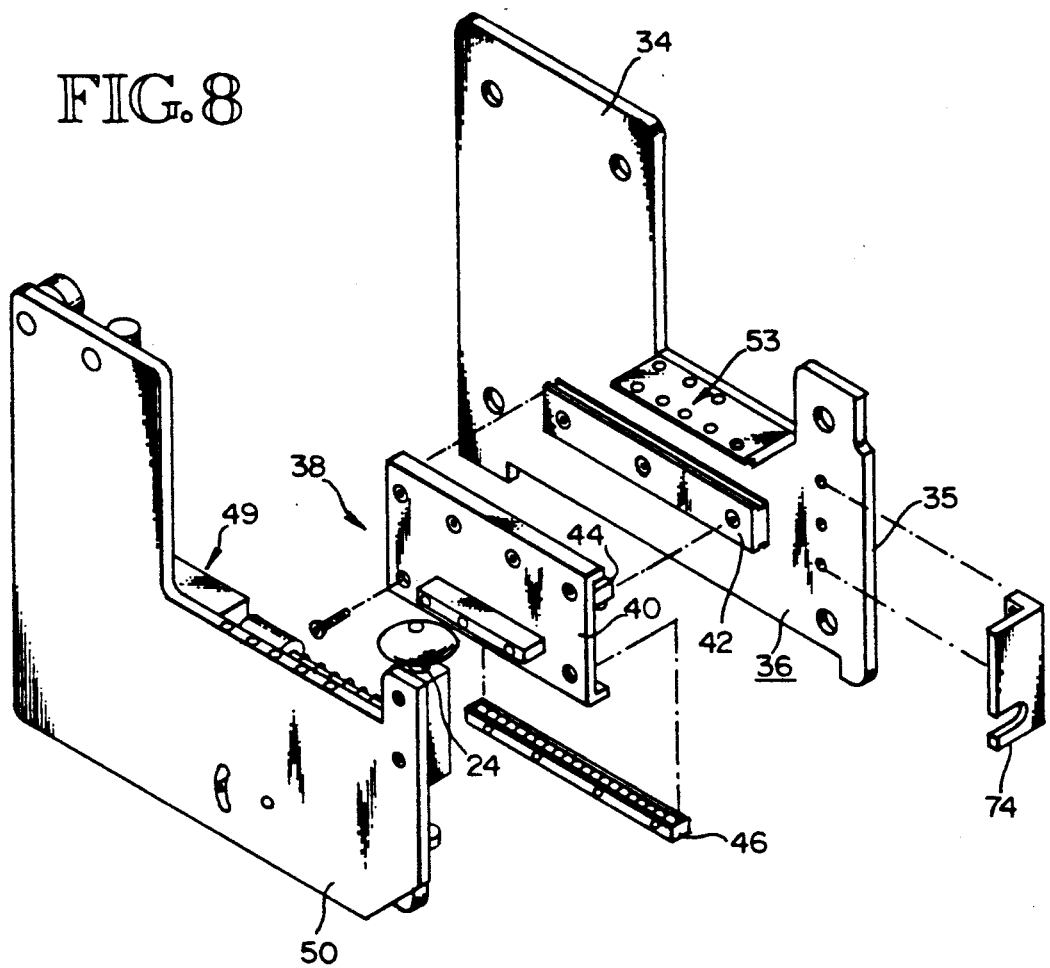

TWO AXIS TRACER FOR FASTENER OPERATIONS

DESCRIPTION

1. Technical Field

This invention relates generally to automatic fastener installation systems, such as riveting machines, and more particularly concerns a tracer apparatus which controls the position of the fastener installation heads (riveting heads) relative to the part being worked.

2. Background of the Invention

In a typical large-scale application involving the installation of fasteners such as rivets, bolts and the like, there will often be an extended line or lines of fasteners connecting the two parts being joined. As one example for illustration, in the assembly of aircraft wings, a plurality of support elements, referred to as stringers, are connected, typically by rivets, to wing skins. One or more lines of rivets typically extend the full length of the stringers, the rivets being positioned at closely spaced intervals. The line of rivets must be accurately located in the stringer. This is particularly true, and often more difficult to accomplish, where the stringer has an odd shape, such as where the stringer has several angles, or is a channel, or a J-section, among other possibilities. Accordingly, it is necessary to accurately control the position of the fastener installation heads, i.e. the rivet heads, located on opposing sides of the wing skin, during operation thereof.

The position of the stringer side riveting head between the top and bottom edges of the flange portion of the stringer positioned against the wing skin (referred to as edge distance) is important, as well as its position relatively away from the stringer (referred to as the flying height) when it moves along the stringer to the next riveting location. The riveting head must be controlled to clear pre-existing or just installed rivet heads, and further must work in a confined space, depending upon the shape of the stringer.

In operation, the position of the riveting head is controlled by a sensing apparatus of some kind, generally referred to as a tracer, as well as control elements such as a computer, which receives information from the tracer and moves the riveting head to predetermined positions in sequence.

Presently, edge distance and flying height information are determined separately and independently. A single axis edge distance stylus is located on the stringer side of the wing while the flying height information for both sides is typically obtained by use of normality sensors located on the skin side of the wing. The disadvantage of such a system is that it requires the operator to continually and manually adjust the flying height of the riveting head on the stringer side of the wing. This is time consuming and requires the intervention of an operator, as the flying height distance will vary along the length of the wing as the thickness of the wing itself varies.

DISCLOSURE OF THE INVENTION

Accordingly, the present invention is a two axis tracer apparatus which is for use with fastening apparatus, such as a riveting machine, which operates on selected parts to be fastened, comprising: a sensing means which includes two sensing surfaces which in operation have a fixed positional relationship relative to each other; a mounting assembly for the sensing means, arranged and constructed such that the sensing means is capable of movement in two directions relative to one of the selected parts; means for moving the sensing means in said two directions, respectively, until the one part is contacted by said sensing surfaces; and means for determining the position of the sensing means in said two directions.

BRIEF DESCRIPTION OF THE DRAWINGS

FIG. 8 is a simplified exploded view of the two axis tracer of the present invention.

BEST MODE FOR CARRYING OUT THE INVENTION

Figure 1:
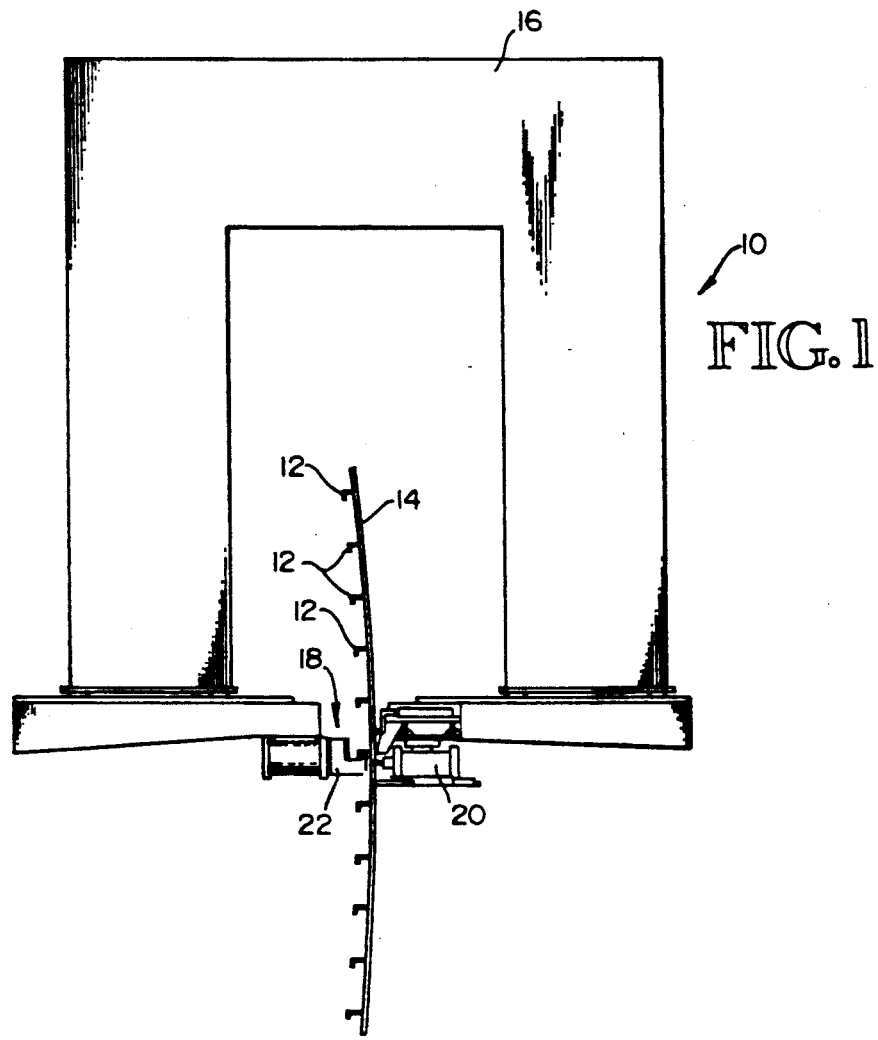
FIG. 1 is an elevational view showing the present invention relative to a representative automatic riveting apparatus.

As one illustration of the use of the present invention, FIG. 1 shows an apparatus 10 for riveting elongated stringers 12—12 on a section of wing skin 14, as part of the manufacture of a wing for a modern commercial aircraft. The riveting apparatus 10 includes an inverted U-shaped yoke 16 having riveting head apparatus 18 and 20 located on opposite sides of the wing skin in conventional fashion. In operation, the stringers 12—12 are secured to the wing skin 14 by a line of fasteners, such as rivets, which are positioned at closely spaced intervals, i.e. every two inches or so, along the length of the stringers. In the system of FIG. 1, riveting head 18, on the stringer side of the wing, forms the actual head of the rivet, while opposing riveting head 20 is on the other side (skin side) of the wing.

The position of the riveting head 18 as it moves lengthwise along the stringer, performing the riveting operation, is controlled by a two axis tracer assembly, shown generally at 22, the structure and arrangement of which comprises the present invention. The tracer assembly 22 controls the position of riveting head 18 relative to the wing as well as the vertical position of the entire riveting apparatus 10. It should be understood that while FIG. 1, as well as the other figures and the following specification, teach a particular fastener installation apparatus, i.e. an automatic riveting machine, and a particular application, i.e. the riveting of a stringer to a wing skin, for purposes of illustration and explanation, the tracer apparatus of the present invention is not limited to a particular fastener apparatus or application. Also, while the two axis tracer of the present invention is particularly useful in riveting complexly configured parts like the stringer shown, it can be used for parts having other configurations.

Figure 2:
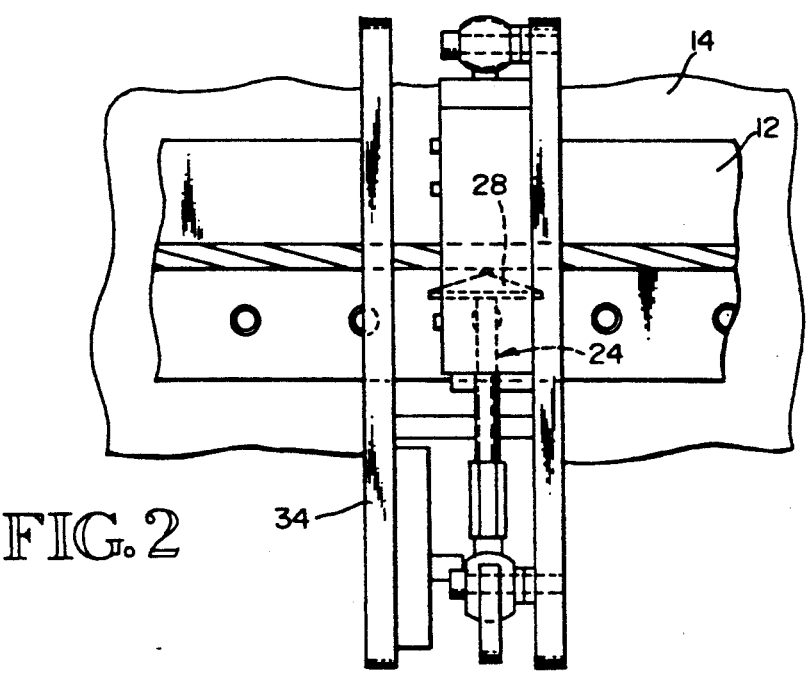
FIG. 2 is a rear view of the two axis tracer apparatus of the present invention.
Figure 3:
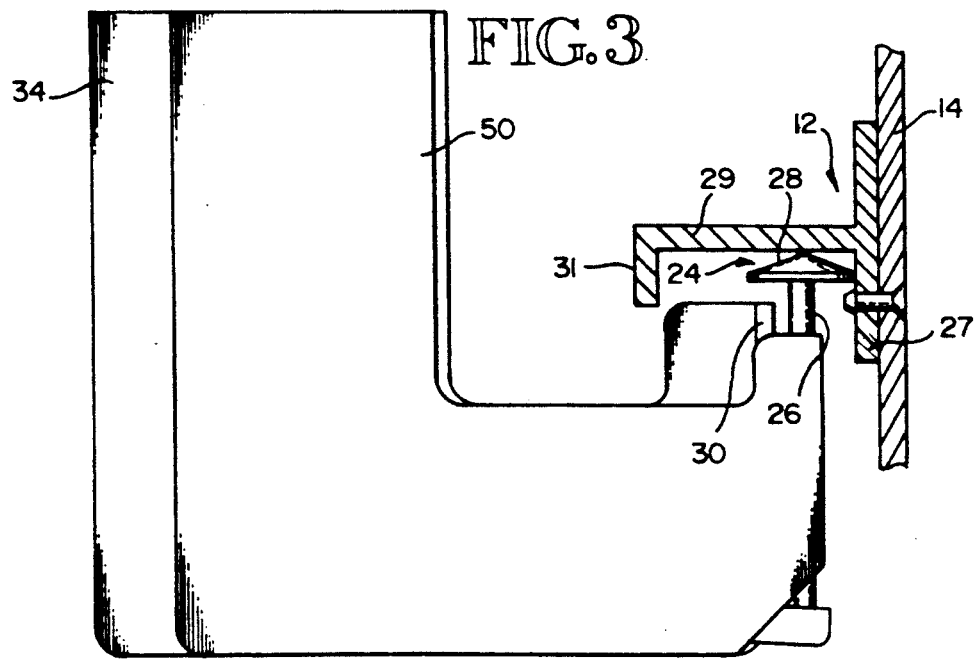
FIG. 3 is a side elevational view of the tracer apparatus of FIG. 2.

FIGS. 2 and 3 show simplified rear and side elevational views showing the two axis tracer relative to particular parts being riveted, i.e. stringer 12 and the wing skin 14. The two axis tracer assembly 22 includes a sensing member 24. In the embodiment shown, sensing member 24 includes a vertical stem portion 26, which is approximately 3¼ inches long and has a diameter of approximately 0.25 inches. At the top end of stem 26 is a cap portion 28, which in the embodiment shown is in the general form of a mushroom, circular in outline (viewed from the top) with the upper surface curving slightly downwardly from the center to the peripheral edge thereof. Sensing member 24 is mounted for vertical movement relative to the remainder of the tracer, as described in more detail hereinafter.

The combination of a riveting ram and rivet die on the forward end thereof, referred to generally as a riveting head anvil, is part of the rivet head assembly, producing in operation the actual upset of the rivet. These elements are conventional and are not shown in the figures. Immediately adjacent to the riveting anvil are clamp-up members which include clampup pads on the forward ends thereof. The clamp-up members can have different configurations and arrangements, depending upon the configuration of the stringer. The two axis tracer 22 is positioned immediately adjacent one side of a clamp-up member. The tracer 22 can be positioned on either the downstream side (preceding the riveting head in the direction of movement thereof) or the upstream side (following the riveting head in the direction of movement thereof) of the combination of the riveting anvil and the clamp-up members.

Referring to FIG. 8, the tracer assembly 22 includes a back plate 34, generally in the shape of an "L" and similar in shape to the clamp-up member in the rivet head assembly. The back plate 34 includes a front edge 35 which is adjacent the part to be worked, i.e. stringer 12. In the embodiment shown, the configuration of tracer 22, as shown in FIG. 3, is coordinated with the shape of stringer 12, which includes a flange portion 27 which is against the wing skin 14 and a web portion 29 which extends outwardly from the flange portion at a 90° angle thereto and includes an end flange portion 31 which extends downwardly parallel with flange portion 27. In the embodiment shown, back plate 34 has a width of 7.4 inches at its widest part, a height of 7.1 inches and is approximately 3/16" thick. Back plate 34 is secured to one of the clamp-up members adjacent the riveting head anvil by means of screws or the like.

Secured to the interior surface 36 of back plate 34 is a slider assembly shown generally at 38. In the embodiment shown, slider assembly 38 includes a slider plate 40 which has a shallow U-shaped cross-sectional configuration, a slider mount 42, and two elongated roller bearing elements 44 and 46. Roller bearing elements 44 and 46 mate in a slidable relationship with the upper and lower contoured edges of slider mount 42. Slider plate 40 is secured to the two slider bearing elements 44, 46, such that slider plate 40 can move longitudinally along slider mount 42, thus in effect moving toward and away from the part to be worked.

The functional elements of the tracer, including sensing member 24, which are discussed in detail hereinafter, are part of a front plate assembly 49, as shown most clearly in FIG. 7, which includes a front plate 50 which is secured to slider plate 40, so that the entire front plate assembly 49 moves along with the slider plate 40. Front plate 50 is also generally L-shaped in configuration, similar in height but slightly less wide than back plate 34. Again, the particular configuration of the tracer assembly 22, including front plate 50, can be varied, depending on the configuration of the part being worked.

An elongated cover plate 53 (FIG. 8) is positioned between the front and back plates over a portion of the upper edges thereto. The cover plate 53 is secured to a portion of the top edge of the front plate 50 and the top edge of slider plate 40. Thus, the front plate assembly 49 and the cover plate 53 can move relative to back plate 34 by means of the slider assembly 38. The above-described arrangement permits the sensing member 24 to move horizontally, i.e. fore and aft, when the tracer is oriented as shown.

Figure 7:
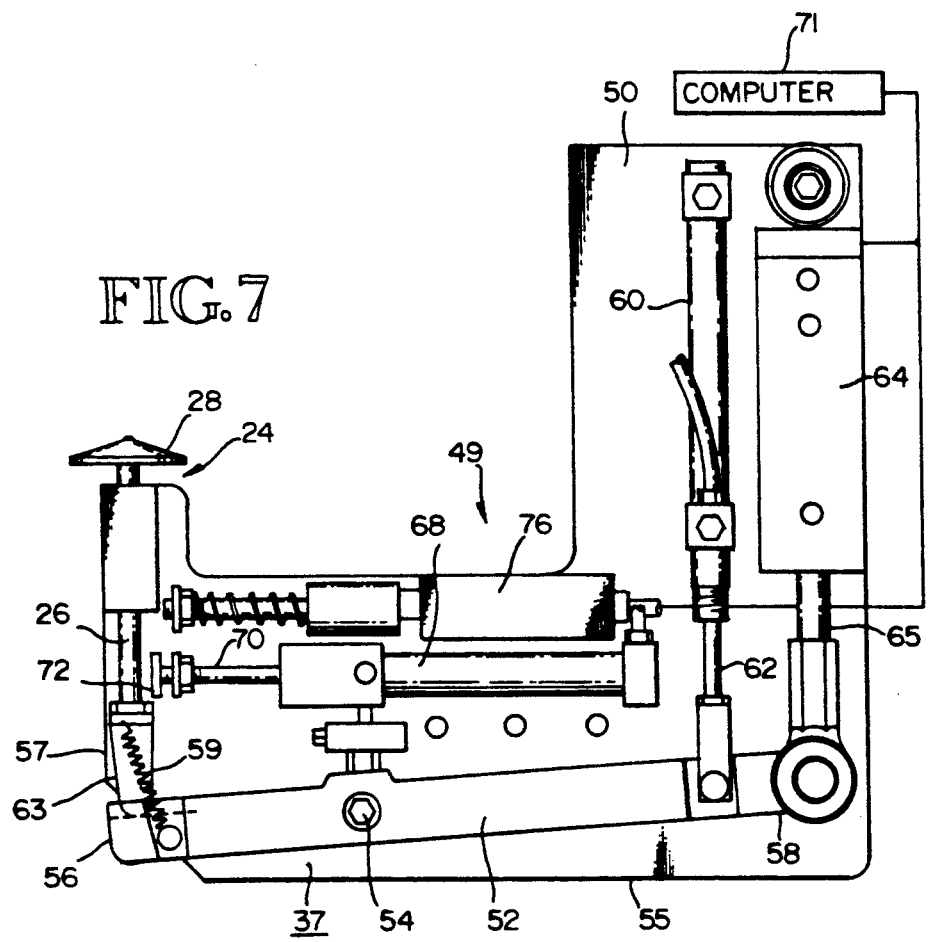
FIG. 7 is a side elevational view of the two axis tracer of the present invention showing most of the functional elements thereof.

FIG. 7 shows the functional elements of the two axis tracer, which are part of the front plate assembly 49, in addition to the front plate 50 itself. Vertical movement of sensing member 24 is provided by an elongated horizontal lever arm 52. Lever arm 52 is pivoted about a fixed pin 54 which is secured to, and extends inwardly from, the interior surface 37 of front plate 50. Pin 54 is located near the lower edge 55 of front plate 50 approximately 2¼inches from the front edge 57 thereof. The forward end 56 of lever arm 52 is adapted to receive a radiused end piece 63 which is threaded on the lower end of stem 26 of sensing member 24. A spring 59 extends from the vicinity of the forward end of lever arm 52 to the upper end of the radiused end piece 63. The arrangement allows the forward end of the lever arm and the stem of the sensing member to move slightly relative to each other as needed during movement of the lower arm, with spring 59 in essence loading the sensing member 24 onto the forward end of the lever arm. Operating on and connected to the lever arm 52 in the vicinity of the rear end 58 thereof is an operating arm 62 of an air cylinder 60. A source of pressurized air (not shown) is connected to the air cylinder 60. In operation, lever arm 52 rotates about pin 54 under the control of air cylinder 60, resulting in the vertical movement of sensing member 24.

The relative position of lever arm 52, and hence the relative vertical position of sensing member 24, is determined by a linear potentiometer 64, the extending arm 65 of which is connected to lever arm 52 in the vicinity of the rear end 58 thereof. Hence, as lever arm 52 rotates, whether under the control of air cylinder 60 or another force acting directly on the sensing member which overcomes the action of the air cylinder, potentiometer 64 determines the vertical position of the sensing member 24. Air cylinder 60 and potentiometer 64 are both mounted in conventional fashion, such as by brackets or the like to front plate 50.

The two axis tracer assembly 22 further includes a second air cylinder 68, which is also a part of the front plate assembly 49. Air cylinder 68 includes an operating arm 70, at the free end of which is secured a connecting nut member 72. Connecting nut member 72 fits into a bracket 74 (FIG. 8) which is secured to the interior surface 36 of rear plate 34, forward of the slider assembly 38. In operation, when operating arm 70 is in its fully retracted position (toward the rear of front plate assembly 49), the front plate assembly 49 and hence sensing member 24 are in their forwardmost position, relative to stringer 14, while when operating arm 70 is in its fully extended position, front plate assembly 49 and sensing member 24 are in their rearmost position. The relative horizontal position (in/out) of sensing member 24 is determined by a linear potentiometer 76 which is positioned above air cylinder 68 in the embodiment shown. Both air cylinder 68 and potentiometer 76 are mounted on the interior surface of front plate 50, by means of brackets or bolts or similar means.

Figure 4A:
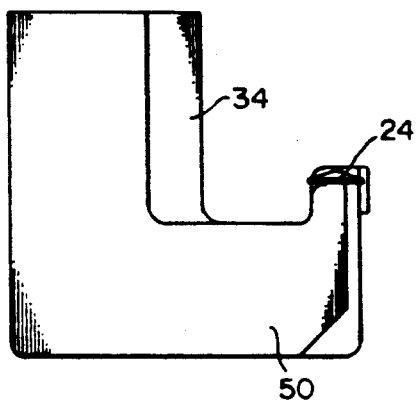
FIGS. 4A-4D are simplified side elevational views showing four positions of the two axis tracer apparatus of the present invention.
Figure 4B:
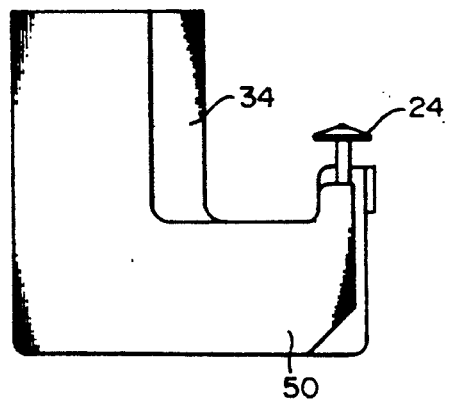
Figure 4C:
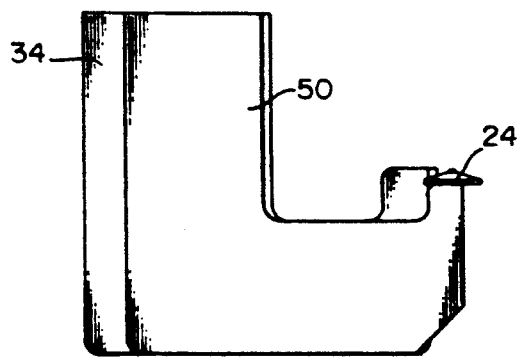
Figure 4D:
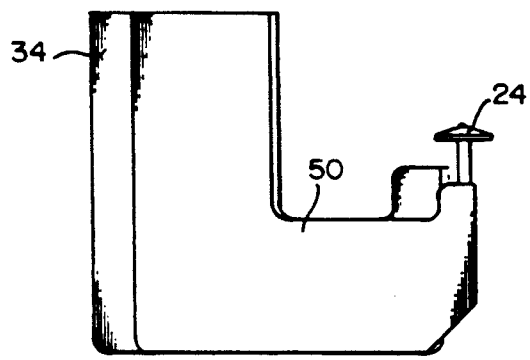

FIGS. 4A–4D show simple representations of the various combinations of extreme positions of sensing member 24. FIG. 2A shows sensing member 24 in its fully retracted position, in both directions or axes (up/down and in/out). In this position, front plate assembly 49 is in its rearmost position. FIG. 4B shows sensing member 24 in its fully extended vertical (up/down) position, but in its fully retracted horizontal (in/out) position. FIG. 4C shows the sensing member 24 in its retracted vertical position, but fully extended in the horizontal direction (the front plate assembly is fully forward). FIG. 4D shows sensing member 24 in its fully extended position, both vertically and horizontally. It should be understood that sensing member 24 can be located in any position between fully extended and fully retracted in both directions independently.

In actual initial operation of the tracer assembly, the air cylinders 60 and 68 will operate to initially extend the sensing member 64 vertically until the top of cap portion 28 of the sensing member 24 contacts the extending web portion of the stringer and to move the front plate assembly 49 (and sensing member 24) horizontally until the peripheral edge of cap portion 28 contacts the flange portion of the stringer. It should be understood that the tracer 22 could be oriented differently so that the two directions are not vertical and horizontal. Also, the directions could be substantially vertical and horizontal, i.e. ±12° from the vertical and/or horizontal. The sensing member and the front plate assembly are held in this position by action of the air cylinders. The potentiometers 64 and 76 determine the position of the sensing member 24 and this information is transmitted to the system control computer 71. The control computer will then move the rivet head assembly in both directions, overcoming the pressure of the air cylinders until a selected "null" or base position is reached for both directions or axes of movement of the sensing member.

The null point in the embodiment shown is adjustable but can be set, as an example, half-way between the fully extended and the fully retracted positions for both directions. This is the base position for the riveting head and the two axis tracer. The null or base point can be anywhere between the fully extended and full retracted positions. The position of the riveting head assembly relative to the stringer in both directions is now known, and riveting operations can commence. Typically, a hole will first be drilled in the parts to be joined, then a rivet will be inserted, and then the riveting apparatus will be actuated to produce the rivet upset. The riveting apparatus and/or the wing is then moved to the next rivet location. As the configuration or relative position of the wing varies along the length thereof, the tracer assembly senses the change and this information is provided to the control circuit which in conventional fashion will change the base position of the riveting head relative to the stringer.

The arrangement of the present invention results in an automatic two direction (two axis) control over the position of the riveting head relative to the stringer. This is achieved by a single sensing member having a sensing portion with a particular configuration. In the embodiment shown, the sensing portion is the mushroom-shaped cap, which has two separate sensing surfaces in a fixed relationship to each other, one surface 80 contacting the stringer in one desired direction or axis and the other surface 82 contacting the stringer in the other desired direction. The two surfaces 80 and 82 can be adjustable relative to each other, but after being adjusted, they are fixed during a particular operation, i.e. for a particular stringer configuration. In the particular embodiment shown, these two surfaces are perpendicular to each other so that the two directions being determined are perpendicular, one substantially vertical, the other substantially horizontal, for the part shown.

Figure 5:
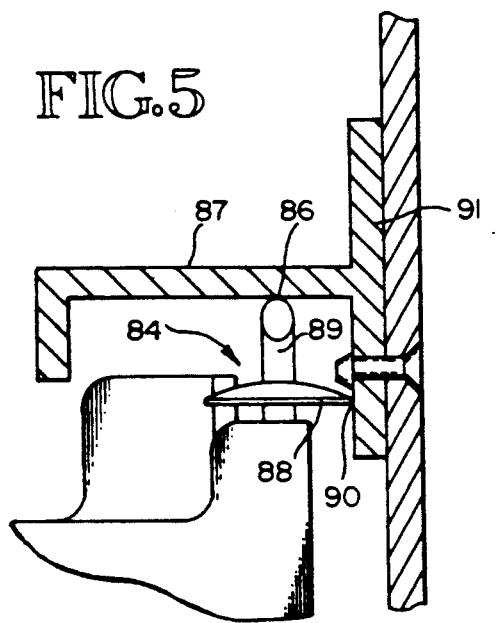
FIGS. 5 and 6 show alternative embodiments of a portion of the two axis tracer apparatus of the present invention.
Figure 6:
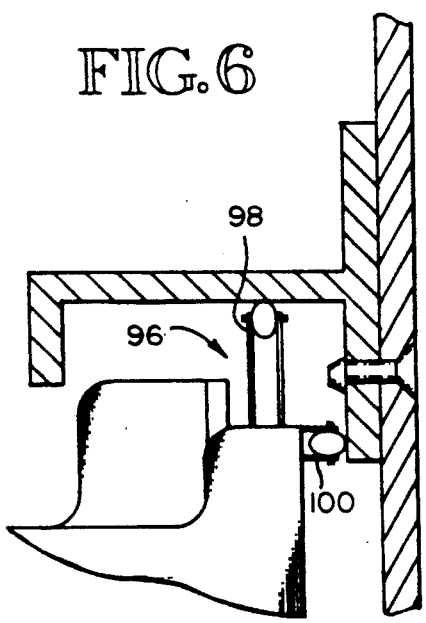

While the embodiment shown uses a mushroom-shaped configuration portion to accomplish the desired two axis sensing with a single element, it should be understood that other configurations can be used as well. FIGS. 5 and 6 show two such alternatives. In the alternative shown in FIG. 5, the sensing member 84 includes a stylus-like upper tip 86, the end portion of which contacts the web portion 87 of the stringer in the vertical direction, which results in the edge distance determination. A disk-like portion 88, positioned a short distance below the stylus tip 86, extends outwardly away from the stem 89 of the sensing member 84. The peripheral edge 90 of disk 88 contacts stringer flange 91, which results in the flying height distance determination. In a variation, the disk 88 could be movable vertically, thereby providing an adjustment capability for the sensing member to accommodate different parts. A locking nut could be used, on a threaded stem, to lock the disk 88 in place once the proper location thereof is determined.

Both the stylus tip 86 and the disk 88 can be made rotatable about stem 89 so that the sensing surfaces on tip 86 and disk 88 roll along the corresponding surfaces of the stringer.

FIG. 6 shows a sensing member 96 which includes two roller members 98, 100, each of which includes a surface element mounted for rotation. Roller member 98 moves vertically for a determination of the edge dimension distance while roller member 100 contacts the flange portion of the stringer for determination of the flying height distance. Other configurations providing the required fixed physical relationship between two sensing surfaces are possible.

The advantage of the present system is that a single sensing means having two sensing surfaces which have a fixed relationship to each other (in operation) produces accurate position information for two directions or axes for one side, i.e. the stringer side, of a part being riveted. Both the edge distance and the flying height distance are automatically determined by the present invention.

The sensing member configurations and the arrangement of the two axis tracer are such that the sensing member clears installed rivets, i.e. the sensing member does not contact the installed rivets, as the rivets pass the sensing member during operation of the automatic riveting system. This capability is shown clearly in several of the figures. Further, the particular arrangement of the sensing member and the tracer assembly in the embodiment shown permits the two axis tracer of the present invention to be used effectively in rather confined areas such as with the J-stringer shown and other similar part configurations.

It should be understood that a preferred embodiment of the invention has been disclosed for purposes of illustration. Changes, modifications, and substitutions may be made to the preferred embodiment without departing from the spirit of the invention, which is defined by the claims which follow:

What is claimed is:

1. A two axis tracer apparatus for use with fastening apparatus operating on selected parts to be fastened, comprising:

a sensing means for two axis positioning of the fastening apparatus relative to the selected parts, the sensing means including at least one sensing member having two sensing surfaces which in operation have a fixed positional relationship relative to each other;

a mounting assembly for the sensing means, arranged and constructed such that the sensing means is capable of movement in two axial directions relative to one of the selected parts;

means for moving the sensing means in said two directions until the one part is contacted by said two sensing surfaces, wherein the two sensing surfaces on the sensing member are so positioned relative to each other and relative to the mounting means that the one part is contacted at two spaced-apart locations, respectively, by said two sensing surfaces; and means for determining the position of said sensing means in said two directions.

2. An apparatus of claim 1, wherein the two sensing surfaces are perpendicular to each other.

3. An apparatus of claim 1, wherein the two sensing surfaces are adjustable relative to each other.

4. An apparatus of claim 1, including means wherein one direction is substantially vertical and the other is substantially horizontal.

5. An apparatus of claim 1, further including means transmitting the position information to a control circuit for the fastening apparatus.

6. An apparatus of claim 1, wherein the fastening apparatus is a riveting machine and the position information is used to control the position of a riveting head portion of the riveting machine.

7. An apparatus of claim 1, including means for moving the sensing means to a known null position, which establishes a base position of the fastening apparatus relative to the one part.

8. An apparatus of claim 1, wherein the one part is a stringer having a first portion positioned against a second part which is a wing skin and a second portion extending away from the second part, and wherein the two surfaces of the sensing means contact, respectively, the first and second portions of the one part.

9. An apparatus of claim 1, wherein the sensing means is moved relative to the mounting means in one direction and wherein the mounting means and the sensing means are moved together in the other direction.

10. An apparatus of claim 1, wherein the sensing means is movable sufficiently away from the one part that the sensing surfaces can clear any fasteners extending from the one part as the sensing means moves along the one part.

11. An apparatus of claim 6, wherein the sensing means can be moved into a position in which the sensing surfaces are within the outline of the riveting head.

12. An apparatus of claim 1, wherein the tracer apparatus includes a back support plate member which is secured to a head assembly portion of the fastener apparatus and further includes a slider assembly slidably mounted on the support plate, wherein the mounting assembly is connected to the slider assembly for movement thereof with the slider assembly toward and away from the selected parts in one direction.

13. An apparatus of claim 1, wherein the sensing means includes a mushroom-shaped element having a top and a peripheral edge, and wherein the two sensing surfaces are the top and peripheral edge of the mushroom element, respectively.

14. An apparatus of claim 1, wherein the sensing means includes a tip element having a lead portion, and a disk element having a peripheral edge located therebelow, and wherein the two sensing surfaces comprise the lead portion of the tip element and the peripheral edge of the disk, respectively.

15. An apparatus of claim 1, wherein the sensing means includes two roller members having roller surfaces, and wherein the two sensing surfaces comprise the roller surfaces, respectively, of the roller members.

16. An apparatus of claim 1, wherein the apparatus includes a lever arm actuated by a first air cylinder for control of the sensing means in one direction, and further includes a second air cylinder having an extendable operating rod, the end of which is fixed so that the mounting means and the sensing means are moveable by action of the second air cylinder in the other direction.

17. An apparatus of claim 16, including linear potentiometers for determining the relative position of the sensing means in the two directions.

18. A tracer apparatus for use with a riveting apparatus for fastening a stringer element to a second, larger element, comprising:

a riveting head assembly which includes a sensing means having at least one sensing surface;

a mounting assembly for the sensing means arranged and constructed such that the sensing means is capable of movement toward and away from a base portion of the stringer, the base portion positioned against the second element;

mean for moving the sensing means toward the base portion of the stringer, until the base portion is contacted by said sensing surface; and means for determining the position of said sensing means, and hence said riveting head assembly, relative to said base portion.

19. An apparatus of claim 18, wherein the sensing means includes a sensing member having two sensing surfaces which have a fixed positional relationship relative to each other, wherein the mounting means is arranged and constructed such that the sensing member is also capable of movement outward and away from a web portion of the stringer which extends outwardly away from the other element, wherein the means for moving includes means for moving the sensing member towards and away from both the web portion and the base portion of the stringer and wherein the determining means includes means for determining the position of said sensing member and hence said riveting head relative to both said base portion and said web portion of the stringer.

20. An apparatus of claim 18 including means for automatically adjusting the position of said riveting head assembly relative to the stringer in accordance with position information from the determining means.

* * * * *